US012763355B2

(12) United States Patent
Zheng et al.

(10) Patent No.: US 12,763,355 B2
(45) Date of Patent: Oct. 13, 2026

(54) CLAMPING ASSEMBLY, CONVEYING MECHANISM, AND DEVICE FOR ASSEMBLING BATTERY CELL

(71) Applicant: Contemporary Amperex Technology (Hong Kong) Limited, Hong Kong (CN)

(72) Inventors: Zhijian Zheng, Ningde (CN); Yuan Peng, Ningde (CN); Xiang Fan, Ningde (CN); Gang Lin, Ningde (CN); Yuqun Zhou, Ningde (CN); Chang Hong, Ningde (CN); Wenqing Nie, Ningde (CN)

(73) Assignee: Contemporary Amperex Technology (Hong Kong) Limited, Hong Kong (CN)

( * ) Notice: Subject to any disclaimer, the term of this patent is extended or adjusted under 35 U.S.C. 154(b) by 0 days.

(21) Appl. No.: 19/021,227

(22) Filed: Jan. 15, 2025

(65) Prior Publication Data

US 2025/0158101 A1 May 15, 2025

Related U.S. Application Data

(63) Continuation of application No. PCT/CN2023/070163, filed on Jan. 3, 2023.

(51) Int. Cl.
*H01M 10/04* (2006.01)
*B65G 47/90* (2006.01)

(52) U.S. Cl.
CPC ........ *H01M 10/0404* (2013.01); *B65G 47/90* (2013.01)

(58) Field of Classification Search
USPC .......................................................... 294/207
See application file for complete search history.

(56) References Cited

U.S. PATENT DOCUMENTS 4,593,948 A * 6/1986 Borcea .................. B25J 13/081 294/115
4,723,806 A * 2/1988 Yuda ..................... B25J 15/028 901/39

(Continued)

FOREIGN PATENT DOCUMENTS

CN 113734722 A 12/2021
CN 114135766 A 3/2022

(Continued)

OTHER PUBLICATIONS

International Search Report received in the counterpart international application PCT/CN2022/109150, mailed on Dec. 19, 2022.

(Continued)

*Primary Examiner* — Saul Rodriguez
(74) *Attorney, Agent, or Firm* — K&L Gates LLP

(57) ABSTRACT

Embodiments of this application provide a clamping assembly, a conveying mechanism, and a device for assembling a battery cell. The clamping assembly includes: two clamping modules apart from each other in a first direction, where a material is located between the two clamping modules; and a moving module linked to the two clamping modules. The two clamping modules are configured to: when the moving module moves along a second direction, move along the first direction away from each other to release the material or move along the first direction approaching each other to clamp the material, the second direction being different from the first direction. The clamping assembly, the conveying mechanism, and the device for assembling a battery cell in the embodiments of this application can improve the conveying and processing efficiency of the material.

18 Claims, 5 Drawing Sheets

(56) References Cited

U.S. PATENT DOCUMENTS

| | | | | |
|---|---|---|---|---|
| 4,898,416 | A * | 2/1990 | Hubbard | B25J 9/1005<br>901/32 |
| 4,913,481 | A * | 4/1990 | Chin | B25J 15/028<br>294/207 |
| 5,595,413 | A * | 1/1997 | McGeachy | B25J 15/0253<br>294/207 |
| 5,967,581 | A * | 10/1999 | Bertini | B25J 15/0253<br>294/207 |
| 2010/0052348 | A1* | 3/2010 | Williams | F16C 29/126<br>294/119.1 |
| 2016/0245380 | A1* | 8/2016 | Kempter | F16H 25/186 |
| 2020/0353597 | A1* | 11/2020 | Tseng | B25J 15/028 |

FOREIGN PATENT DOCUMENTS

| | | | |
|---|---|---|---|
| CN | 216335185 | U | 4/2022 |
| CN | 216375182 | U | 4/2022 |
| DE | 19740891 | A1 | 3/1999 |
| DE | 102008035021 | B4 | 11/2013 |
| KR | 20200101145 | A | 8/2020 |
| WO | 2009/135597 | A1 | 11/2009 |
| WO | 2016/071198 | A1 | 5/2016 |

OTHER PUBLICATIONS

Written Opinion of ISA received in the counterpart international application PCT/CN2022/109150, mailed on Dec. 19, 2022.

The partial supplementary European search report of counterpart EU application 23892750.3, mailed on Dec. 4, 2024, 12 pages.

The extended European search report of counterpart EU application 23892750.3, mailed on Feb. 25, 2025, 10 pages.

* cited by examiner

CLAMPING ASSEMBLY, CONVEYING MECHANISM, AND DEVICE FOR ASSEMBLING BATTERY CELL

CROSS-REFERENCE TO RELATED APPLICATIONS

This application is a continuation of International Application PCT/CN2023/070163, filed on Jan. 3, 2023, which is incorporated herein by reference in its entirety.

TECHNICAL FIELD

This application relates to the field of battery technologies, and in particular, to a clamping assembly, a conveying mechanism, and a device for assembling a battery cell.

BACKGROUND

Energy saving and emission reduction are crucial to the sustainable development of the automobile industry. Electric vehicles, with their advantages in energy conservation and emission reduction, have become an important part of sustainable development of the automobile industry. For electric vehicles, battery technology is an important factor in connection with their development.

With the development of battery technologies, factors influencing battery performance extend beyond battery materials, and the manufacturing process of batteries has also become a crucial factor restricting the optimal performance of batteries. Therefore, how the processing and production efficiency of batteries is improved is one of the important topics in the field of batteries.

SUMMARY

Embodiments of this application provide a clamping assembly, a conveying mechanism, and a device for assembling the battery cell, which can improve the conveying and processing efficiency of the material.

According to a first aspect, a clamping assembly is provided, where the clamping assembly is used for a conveying mechanism and includes: two clamping modules apart from each other in a first direction, where a material is located between the two clamping modules; and a moving module linked to the two clamping modules. The two clamping modules are configured to: when the moving module moves along a second direction, move along the first direction away from each other to release the material or move along the first direction approaching each other to clamp the material, the second direction being different from the first direction.

Therefore, during the clamping of the material by the clamping assembly of the embodiments of this application, when the moving module of the clamping assembly moves under the action of a driving force, the movement of the moving module will not obstruct the movement of the clamping module. This facilitates clamping of the material between the two clamping modules or removal or placement of the material between the two clamping modules, without the need to consider whether the movement direction of the moving module hinders the material, which is more convenient and efficient, thereby improving the conveying efficiency of the material.

In some embodiments, the clamping assembly includes: a holding structure, where the holding structure is connected to the moving module, the holding structure is configured to hold the moving module at a target position, and the two clamping modules are configured to clamp the material along the first direction when the moving module is located at the target position.

Under the action of the holding structure, the moving module can be located at the target position, and correspondingly, the two clamping modules are relatively close to each other, so that the two clamping modules can keep clamping the electrode assembly along the first direction.

In some embodiments, the holding structure includes a spring extending along the second direction. When the spring is not subjected to an external force, the spring automatically returns to its initial state, simultaneously pushing the moving module to the target position and holding it at the target position, so that the two clamping modules keep clamping the electrode assembly. The structure is simple and easy to implement.

In some embodiments, when the moving module is subjected to a driving force applied by a driving assembly of the conveying mechanism along the second direction, the moving module is configured to move along the second direction, and the two clamping modules are configured to move along the first direction away from each other to release the material.

The driving force applied by the driving assembly allows the moving module to move along the second direction, thereby causing the clamping modules linked to the moving module to move along the first direction. The structure is simple and easy to implement.

In some embodiments, the moving module includes a sliding groove structure, and each clamping module in the two clamping modules includes a protrusion structure, and at least part of the protrusion structure is accommodated in the sliding groove structure and moves in the sliding groove structure.

Thus, through reasonable design of the sliding groove structure, the two clamping modules with protrusion structures can be linked relative to the moving module with the sliding groove structures. The structure is simple and easy to implement.

In some embodiments, the extension direction of the sliding groove structure is different from the second direction and the first direction. As a result, when the driving assembly applies a driving force to the moving module along the second direction, due to the arrangement of the extension direction of the sliding groove structure, the two clamping modules can move along the first direction which is different from the second direction.

In some embodiments, the moving module includes two sliding groove structures, and the two sliding groove structures are in one-to-one correspondence with the protrusion structures of the two clamping modules.

Considering that a material electrode assembly is provided between the two clamping modules in the embodiments of this application, there is a certain distance between the two clamping modules. Correspondingly, there is also a certain distance between the protrusion structures of the two clamping modules. Therefore, two sliding groove structures may be provided to accommodate the two protrusion structures respectively, so that the two sliding groove structures do not affect each other, enhancing structural reliability.

In some embodiments, included angles between the two sliding groove structures and the first direction are equal. Considering that the two clamping modules usually need to move synchronously, for example, approaching or moving away from each other, therefore, the included angles between the two sliding groove structures and the first direction may be arranged to be equal so as to synchronize the movement of the protrusion structures of the two clamping modules, thereby synchronizing the movement of the two clamping modules and improving the clamping efficiency of the two clamping modules.

In some embodiments, the second direction is perpendicular to the first direction. In this way, the movement direction of the moving module is perpendicular to the movement direction of the clamping module, and the two will not affect each other at the movement positions. In addition, when the driving assembly applies a driving force along the second direction, the movement of the two clamping modules will not be hindered, simplifying the structural design and making implementation easier.

In some embodiments, the clamping assembly further includes a bearing module, where the bearing module is stacked with the moving module along a third direction and is adjacent to the material, and a surface of the bearing module facing the material is a bearing surface.

The bearing module is provided between the moving module and the material, for example, provided between the moving module and the electrode assembly, which facilitates the bearing module in bearing the electrode assembly without affecting the movement of the moving module under the action of the driving force, making implementation easier.

In some embodiments, the two clamping modules are respectively configured to clamp two opposite first end surfaces of the material, the first end surface being perpendicular to the bearing surface. The two opposite first end surfaces of the material are clamped by the two clamping modules, so that the clamping force on the material is relatively uniform, maintaining the balance of the material on the bearing surface to enhance the stability of the material on the clamping assembly. Moreover, the first end surface is perpendicular to the bearing surface, so that the clamping of the material by the clamping modules does not affect the standing of the material on the bearing surface under its own gravity, thereby improving the stability of the material.

In some embodiments, the second direction and the first direction are both parallel to the bearing surface. The first direction is parallel to the bearing surface, so that when the two clamping modules move, the material electrode assembly can still remain relatively stable on the bearing surface under its own gravity, avoiding affecting the position of the electrode assembly due to the movement of the clamping modules. Similarly, the second direction is also parallel to the bearing surface, so that when the moving module moves under the action of a driving force, the material electrode assembly can still remain relatively stable on the bearing surface under its own gravity, avoiding affecting the position of the electrode assembly due to the movement of the moving module.

In some embodiments, the material is an electrode assembly in a battery cell.

According to a second aspect, a conveying mechanism is provided and includes the clamping assembly according to the first aspect.

In some embodiments, the conveying mechanism further includes a driving assembly configured to apply a driving force to the clamping assembly, where the clamping assembly is configured to release the material under action of the driving force.

According to a third aspect, a device for assembling a battery cell is provided, including: the conveying mechanism according to the first aspect, where the conveying mechanism is configured to convey components of the battery cell to be assembled between different workstations.

Figure 1:
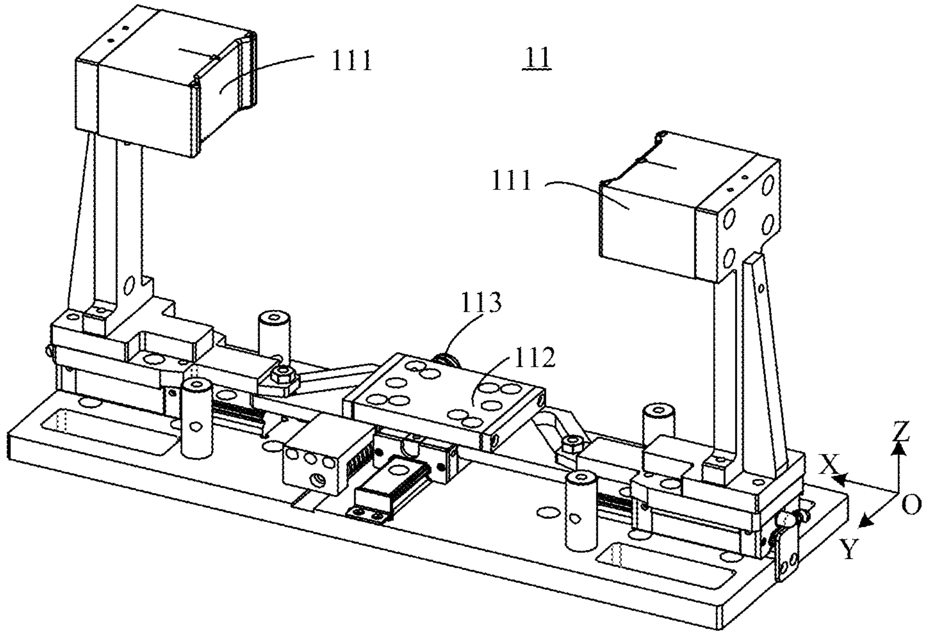
FIG. 1 is a schematic structural diagram of a clamping assembly according to an embodiment of this application.

The accompanying drawings are not drawn to scale.

DESCRIPTION OF EMBODIMENTS

The following further describes the implementations of this application in detail with reference to the accompanying drawings and embodiments. The detailed description of embodiments and the accompanying drawings are intended to illustrate the principle of this application, rather than to limit the scope of this application, meaning this application is not limited to the embodiments described herein.

In the description of this application, it should be noted that, unless otherwise stated, "multiple" means at least two; and the orientations or positional relationships indicated by the terms "upper", "lower", "left", "right", "inside", "outside", and the like are merely for ease and brevity of description of this application rather than indicating or implying that the means or components mentioned must have specific orientations or must be constructed or manipulated according to particular orientations. These terms shall therefore not be construed as limitations on this application. In addition, the terms "first", "second", "third", and the like are merely for the purpose of description and shall not be understood as any indication or implication of relative importance. "Perpendicular" is not perpendicular in the strict sense but within an allowable range of error. "Parallel" is not parallel in the strict sense but within an allowable range of error.

The orientation terms appearing in the following description all are directions shown in the figures, and do not limit the specific structure of the application. In the description of this application, it should also be noted that unless otherwise specified and defined explicitly, the terms "mounting", "connection", and "join" should be understood in their general senses. For example, they may refer to a fixed connection, a detachable connection, or an integral connection, and may refer to a direct connection or an indirect connection via an intermediate medium. Persons of ordinary skill in the art can understand specific meanings of these terms in this application as appropriate to specific situations.

In the embodiments of this application, like reference signs denote like components, and for brevity, in different embodiments, detailed descriptions of like components are not repeated. It should be understood that, as shown in the accompanying drawings, sizes such as thickness, length, and width of various components and sizes such as thickness, length, and width of integrated devices in the embodiments of this application are merely for illustrative purposes and should not constitute any limitations on this application.

Reference to "embodiment" in this application means that specific features, structures, or characteristics described with reference to the embodiment may be included in at least one embodiment of this application. The word "embodiment" appearing in various places in the specification does not necessarily refer to the same embodiment or an independent or alternative embodiment that is exclusive of other embodiments. It is explicitly or implicitly understood by persons skilled in the art that the embodiments described herein may be combined with other embodiments.

Although this application has been described with reference to some preferred embodiments, various modifications to this application and replacements of the components therein with equivalents can be made without departing from the scope of this application. In particular, as long as there is no structural conflict, the various technical features mentioned in the embodiments can be combined in any manner. This application is not limited to the specific embodiments disclosed in this specification but includes all technical solutions falling within the scope of the claims.

The battery mentioned in this application is a single physical module that includes one or more battery cells for providing a higher voltage and capacity. For example, the battery mentioned in this application may include a battery module, a battery pack, or the like. A battery typically includes a box configured to enclose one or more battery cells. The box can prevent liquids or other foreign matter from affecting charging or discharging of the battery cell.

In some embodiments, the battery cell may include a lithium-ion secondary battery, a lithium-ion primary battery, a lithium-sulfur battery, a sodium-lithium-ion battery, a sodium-ion battery, a magnesium-ion battery, or the like. This is not limited in the embodiments of this application. Usually, the battery cell may also be referred to as a cell. The battery cell may be cylindrical, flat, cuboid, or of other regular or irregular shapes. The technical solution of embodiments of this application can be applied to a battery cell of any shape.

The battery cell includes an electrode assembly and an electrolyte. The electrode assembly includes a cathode plate, an anode plate, and a separator. The battery cell mainly relies on the movement of metal ions between a cathode plate and an anode plate to work. The cathode plate includes a cathode current collector and a cathode active substance layer. The cathode active substance layer is applied on a surface of the cathode current collector. A current collector uncoated with the cathode active substance layer protrudes from the current collector coated with the cathode active substance layer and serves as a cathode tab. A lithium-ion battery is used as an example, for which, the cathode current collector may be made of aluminum, and the cathode active substance may be lithium cobaltate, lithium iron phosphate, ternary lithium, lithium manganate, or the like. The anode plate includes an anode current collector and an anode active substance layer. The anode active substance layer is applied on a surface of the anode current collector. A current collector uncoated with the anode active substance layer protrudes from the current collector coated with the anode active substance layer and serves as an anode tab. The anode current collector may be made of copper, and the anode active substance may be carbon, silicon, or the like. To allow a large current to pass through without any fusing, multiple cathode tabs are provided and stacked together, and multiple negative electrode tabs are provided and stacked together. The separator may be made of, for example, polypropylene (Polypropylene, PP), polyethylene (Polyethylene, PE), or the like.

For the development of battery technologies, many design factors need to be considered, for example, performance parameters such as energy density, cycle life, discharge capacity, and charge and discharge rate, as well as the processing efficiency and yield of batteries. For example, through the improvement in the processing efficiency of battery cells, the processing efficiency of the battery can be improved.

The production process of battery cells is highly complex, involving processes such as the processing and assembly of electrode assemblies, assembly between electrode assemblies and end covers, assembly between electrode assemblies and housing bodies, as well as assembly between housing bodies and end covers. Therefore, the production efficiency of battery cells significantly constrains the production efficiency of batteries. Consequently, how the production efficiency of battery cells is effectively enhanced is one of the critical challenges in the field of batteries.

Based on this, an embodiment of this application provides a clamping assembly used for a conveying mechanism, where the clamping assembly includes two clamping modules apart from each other in a first direction, where a material is located between the two clamping modules; and the clamping assembly further includes a moving module linked to the two clamping modules. When the moving module moves along a second direction, the two clamping modules can move along the first direction approaching each other to clamp the material; or the two clamping modules can move along the first direction away from each other to release the material, where the first direction and the second direction are different. In this way, during the clamping of the material by the clamping assembly, when the moving module of the clamping assembly moves under the action of a driving force, the movement of the moving module will not obstruct the movement of the clamping module. This facilitates clamping of the material between the two clamping modules or removal or placement of the material between the two clamping modules, without the need to consider whether the movement direction of the moving module hinders the material, which is more convenient and efficient, thereby improving the conveying efficiency of the material.

It should be understood that the assembly for clamping the material in this embodiment of this application can be used to clamp any material to improve the conveying efficiency of the material. The following describes the clamping assembly in this embodiment of this application in detail with reference to accompanying drawings.

FIG. 1 is a schematic structural diagram of a clamping assembly 11 according to an embodiment of this application. As shown in FIG. 1, the clamping assembly 11 used for the conveying mechanism includes: two clamping modules 111 apart from each other in a first direction X, where the material is located between the two clamping modules 111; and a moving module 112 linked to the two clamping modules 111; where the two clamping modules 111 are configured to: when the moving module 112 moves along a second direction Y, move along the first direction X away from each other to release the material or move along the first direction X approaching each other to clamp the material, the second direction Y being different from the first direction X.

It should be understood that the first direction X in this embodiment of this application may be any direction. For example, the first direction X may include two opposite directions (FIG. 1 shows only one direction included in the first direction X), so that when the two clamping modules 111 move along the first direction X, they may move away from each other or approach each other.

The second direction Y in this embodiment of this application may be any direction different from the first direction X. For example, the second direction Y may also include two opposite directions (FIG. 1 shows only one direction included in the second direction Y), so that the moving module 112 can also reciprocate along the second direction Y.

It should be understood that when the moving module 112 moves along the second direction Y, for example, the moving module 112 moves along any direction included in the second direction Y, the two clamping modules 111 move along the first direction X away from each other, that is, a distance between the two clamping modules 111 gradually increases, so that when there is material between the two clamping modules 111, the material can be released; or if there is no material between the two clamping modules 111, a material can be placed between the two clamping modules 111. On the contrary, when the moving module 112 moves along the second direction Y, for example, the moving module 112 moves along another direction included in the second direction Y, the two clamping modules 111 may also move along the first direction X approaching each other, that is, a distance between the two clamping modules 111 gradually decreases, so that when there is material between the two clamping modules 111, the material can be clamped; or if there is no material between the two clamping modules 111, a space between the two clamping modules 111 can be kept.

In this way, during the clamping of the material by the clamping assembly 11, when the moving module 112 of the clamping assembly 11 moves under the action of a driving force, the movement of the moving module will not obstruct the movement of the clamping module 111. This facilitates clamping of the material between the two clamping modules 111 or removal or placement of the material between the two clamping modules 111, without the need to consider whether the movement direction of the moving module 112 hinders the material, which is more convenient and efficient, thereby improving the conveying efficiency of the material.

It should be understood that the clamping assembly 11 in this embodiment of this application can be used to clamp any material, for example, the material may be an object with regular or irregular shape. Specifically, for ease of description, this embodiment of this application mainly takes the material being the electrode assembly 22 in the battery cell 2 as an example, where the conveying efficiency of the electrode assembly 22 is improved through the clamping assembly 11, thereby improving the assembly efficiency of the battery cell 2.

It should be understood that the battery cell 2 in this embodiment of this application can be used to assemble a battery, and the battery can be used for various electric devices using batteries.

The electric device may be a vehicle, a mobile phone, a portable device, a notebook computer, a ship, a spacecraft, an electric toy, an electric tool, or the like. The vehicle may be a fossil fuel vehicle, a natural gas vehicle, or a new energy vehicle. The new energy vehicle may be a battery electric vehicle, a hybrid electric vehicle, a range-extended electric vehicle, or the like. The spacecraft includes an airplane, a rocket, a space shuttle, a spaceship, and the like. The electric toy includes a fixed or mobile electric toy, for example, a game console, an electric toy car, an electric toy ship, an electric toy airplane, and the like. The electric tool includes an electric metal cutting tool, an electric grinding tool, an electric assembly tool, and an electric railway-specific tool, for example, an electric drill, an electric grinder, an electric wrench, an electric screwdriver, an electric hammer, an electric impact drill, a concrete vibrator, and an electric planer. The embodiments of this application impose no special limitation on the foregoing electric device.

To meet different power usage requirements, the battery may include multiple battery cells, and the multiple battery cells may be connected in series, parallel, or series-parallel, where being connected in series-parallel means a combination of series and parallel connections. The battery may also be called a battery pack. Optionally, multiple battery cells may be connected in series, parallel, or series-parallel to form a battery module first, and then multiple battery modules are connected in series, parallel, or series-parallel to form a battery. In a word, the multiple battery cells may be directly combined into a battery, or may first be combined into battery modules that are then combined into a battery.

Figure 2:
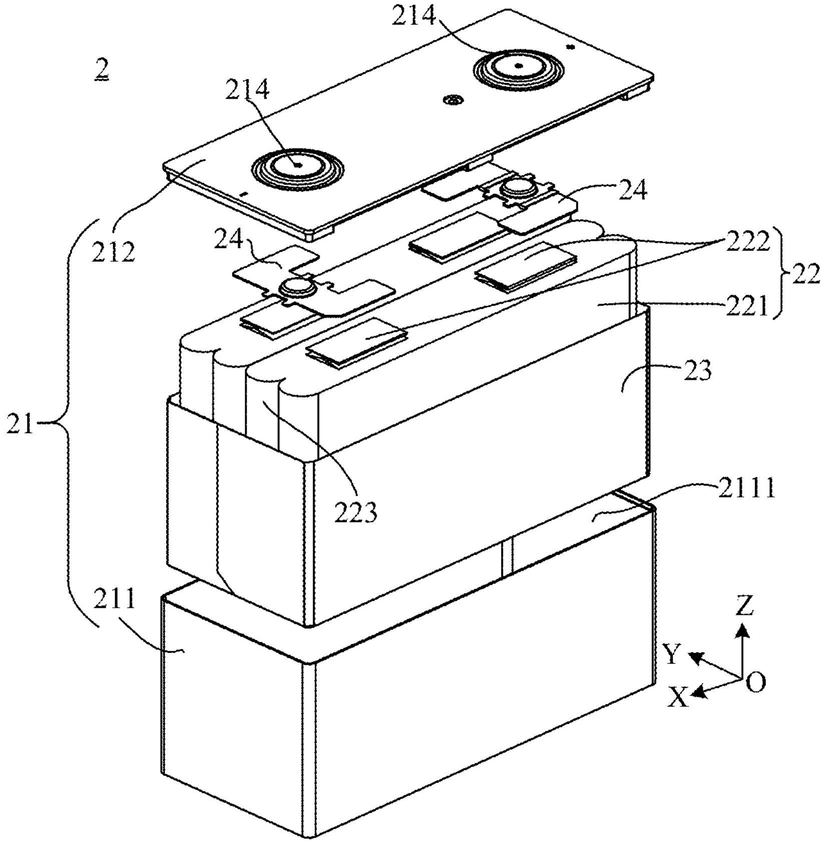
FIG. 2 is a schematic structural exploded view of a battery cell according to an embodiment of this application.

The structure of the battery cell 2 in this embodiment of this application may be flexibly configured depending on practical applications. For example, FIG. 2 is a possible schematic structural exploded view of a battery cell 2 according to an embodiment of this application. The following takes FIG. 2 as an example to introduce the structure of the battery cell 2. As shown in FIG. 2, the battery cell 2 may include one or more electrode assemblies 22 and a housing 21 for accommodating the electrode assemblies 22.

It should be understood that, as shown in FIG. 2, the housing 21 in this embodiment of this application may have a polyhedral structure. Specifically, the housing 21 may include a housing body 211 and an end cover 212, where the housing body 211 may be a hollow structure with at least one end formed with an opening, a shape of the end cover 212 may be adapted to a shape of the housing body 211, and the end cover 212 is configured to cover the opening of the housing body 211, so that the housing 21 isolates the internal environment of the battery cell 2 from the external environment. If the housing body 211 is a hollow structure with an opening formed at one end, one end cover 212 may be provided, for example, as shown in FIG. 2. On the contrary, if the housing body 211 is a hollow structure with openings formed at two opposite ends, two end covers 212 may be provided, where the two end covers 212 cover the openings at two ends of the housing body 211 respectively.

The housing body 211 in this embodiment of this application may be made of various materials, such as copper, iron, aluminum, steel, aluminum alloy, and the like. The end cover 212 may also be made of various materials, such as copper, iron, aluminum, steel, and aluminum alloy. The end cover 212 and the housing body 211 may be made of same or different materials.

The housing 21 in this embodiment of this application may have various shapes, such as a cylindrical shape and a cuboid shape. The housing body 211 matches the end cover 212 in shape, for example, as shown in FIG. 2, the housing body 211 may have a cuboid structure and the end cover 212 has a rectangular plate structure that fits the housing body 211.

For ease of description, the housing 21 having a cuboid shape is taken as an example in this application. Specifically, as shown in FIG. 2, the housing 21 includes: a housing body 211, where the housing body 211 is a hollow structure with an opening at one end; and an end cover 212, where the end cover 212 is configured to cover the opening 2111 of the housing body 211, forming a closed cavity for placing the electrode assembly 22.

In the battery cell 2, the inside of the housing body 211 is configured to accommodate the electrode assembly 22, and depending on practical usage requirements, one or more electrode assemblies 22 may be provided inside the housing body 211. For example, in FIG. 2, the battery cell 2 includes four electrode assemblies 22 arranged along a thickness direction Y of the electrode assembly 22, but this embodiment of this application is not limited thereto.

In this embodiment of this application, the electrode assembly 22 is a component in the battery cell 2 in which electrochemical reactions take place. The electrode assembly 22 may be cylindrical, cuboid, or the like. If the electrode assembly 22 is a cylindrical structure, the housing body 211 may also be a cylindrical structure. If the electrode assembly 22 is a cuboid structure, the housing body 211 may also be a cuboid structure.

For any electrode assembly 22, the electrode assembly 22 may include a tab 222 and a body portion 221. Specifically, as shown in FIG. 2, the electrode assembly 22 may include at least two tabs 222, the at least two tabs 222 may include at least one cathode tab and at least one anode tab, where the cathode tab may be formed by stacking portions of the cathode plate uncoated with the cathode active substance layer, and the anode tab may be formed by stacking portions of the anode electrode plate uncoated with the negative electrode active substance layer.

In this embodiment of this application, the housing 21 is further provided with an electrode terminal 214, where the electrode terminal 214 is configured to be electrically connected to the electrode assembly 22 to output electric energy of the battery cell 2. As shown in FIG. 2, the battery cell 2 may include at least two electrode terminals 214, where the at least two electrode terminals 214 may be located on the same or different walls of the battery cell 2. For example, in FIG. 2, the battery cell 2 includes two electrode terminals 214, and both the electrode terminals 214 are provided on the end cover 212. The end cover 212 is generally in a shape of a flat plate, and two electrode terminals 214 are fixed on a flat surface of the end cover 212. The two electrode terminals 214 are a cathode electrode terminal and a negative electrode terminal respectively. Each electrode terminal 214 is provided with a corresponding connecting member 24, where the connecting member 24 is located between the end cover 212 and the electrode assembly 22 and is configured to electrically connect the electrode assembly 22 to the electrode terminal 214. Specifically, as shown in FIG. 2, the cathode tab of the electrode assembly 22 may be connected to the cathode electrode terminal via a connecting member 24, and the anode tab of the electrode assembly 22 may be connected to the negative electrode terminal via another connecting member 24.

It should be understood that the battery cell 2 in this embodiment of this application further includes an insulation layer 23, where insulation layer 23 is a hollow structure with at least one opening. For example, as shown in FIG. 2, this application mainly takes the case where the insulation layer 23 has one opening as an example, and the opening faces the end cover 212. The insulation layer 23 is provided between the housing body 211 and the electrode assembly 22. The hollow structure of the insulation layer 23 is configured to accommodate the electrode assembly 22, so that the insulation layer 23 covers at least a portion of an outer surface of the electrode assembly 22, where the insulation layer 23 can be configured to maintain electrical insulation between the electrode assembly 22 and an inner wall of the housing body 211. For example, the insulation layer 23 may be a film-shaped cover layer made of an insulating material, covering at least a portion of an outer periphery of the electrode assembly 22. Specifically, the insulation layer 23 may have a sheet-like structure before covering the electrode assembly 22, and the insulation layer 23 forms a hollow opening structure covering the outside of the electrode assembly 22 through the action of a coating mechanism 20.

In this embodiment of this application, the shape of the insulation layer 23 may be determined based on the shape of the electrode assembly 22 or the shape of the housing body 211. For example, in this embodiment of this application, the insulation layer 23 being a cuboid is taken as an example, but this embodiment of this application is not limited thereto.

Optionally, the housing 21 of the battery cell 2 in this embodiment of this application may further be provided with other components. For example, as shown in FIG. 2, the battery cell 20 may further include a pressure relief mechanism, but this embodiment of this application is not limited thereto.

It should be understood that considering that the battery cell 2 includes a plurality of components, the process of assembling the battery cell 2 is complex. The clamping assembly 11 can convey the electrode assembly 22 to complete different assembly processes at different workstations. For example, the clamping assembly 11 can clamp the electrode assembly 22 and convey it to the coating workstation. At the coating workstation, the insulation layer 23 is coated on at least a portion of an outer surface of the electrode assembly 22 through a coating mechanism. Subsequently, the clamping assembly 11 continues to convey the electrode assembly 22 coated with the insulation layer 23 to a housing enclosing workstation. At the housing enclosing workstation, the housing body 211 sleeves outside the electrode assembly 22 coated with the insulation layer 23 through a housing enclosing mechanism, so that the electrode assembly 22 enters the housing body 211. Therefore, the clamping assembly 11 can improve the conveying efficiency of the electrode assembly 22 and further improve the assembly efficiency of the battery cell 2.

Figure 3:
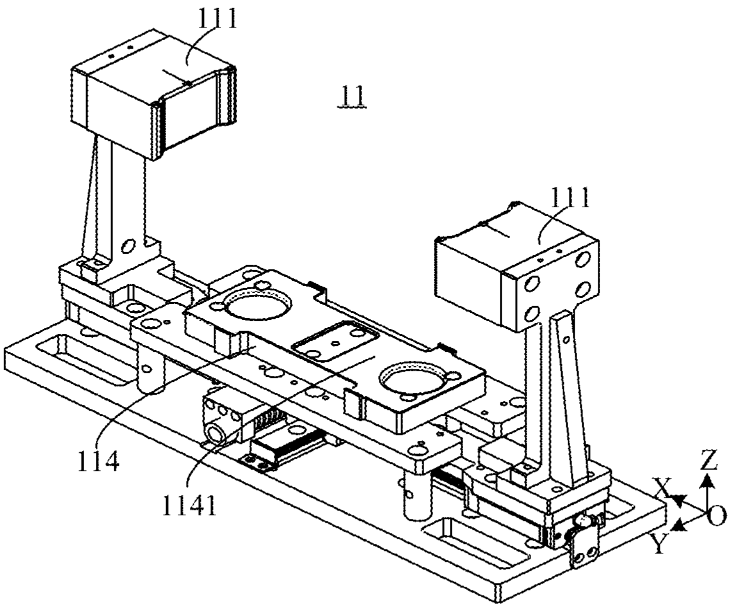
FIG. 3 is a schematic structural diagram of a clamping assembly according to an embodiment of this application.
Figure 4:
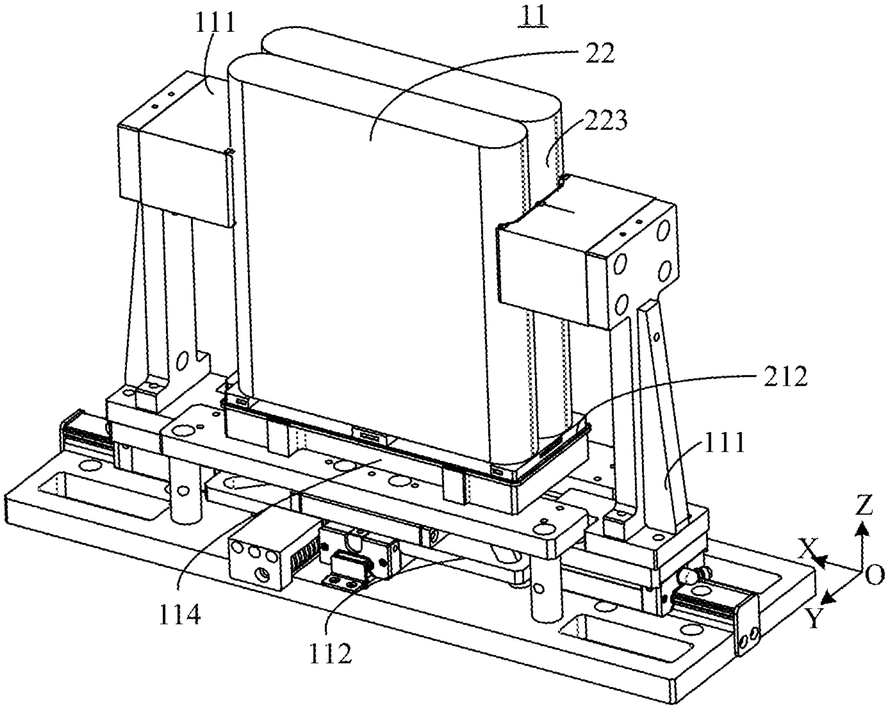
FIG. 4 is a schematic structural diagram of a clamping assembly clamping an electrode assembly according to an embodiment of this application.
Figure 5:
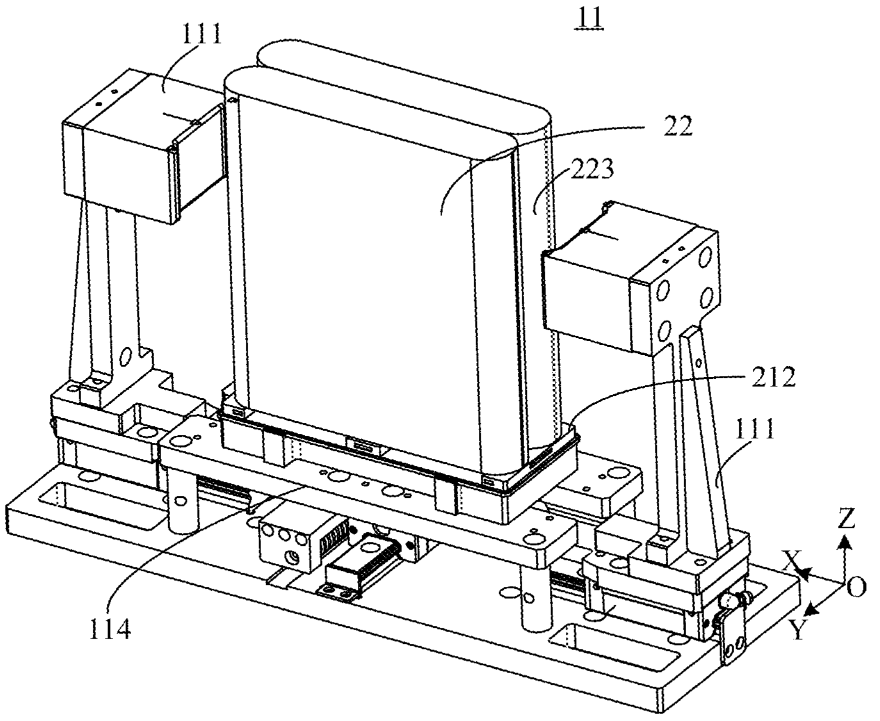
FIG. 5 is a schematic structural diagram of a clamping assembly releasing an electrode assembly according to an embodiment of this application.

FIG. 3 is a schematic structural diagram of a clamping assembly 11 according to an embodiment of this application. For example, to clearly show the structure of the clamping assembly 11, as compared with the clamping assembly 11 shown in FIG. 3, some structures for carrying the electrode assembly 22 are reduced in the clamping assembly 11 shown in FIG. 1. FIG. 4 is a schematic structural diagram of a clamping assembly 11 fixed with an electrode assembly 22 according to an embodiment of this application. For example, the clamping assembly 11 shown in FIG. 4 may be the same as the clamping assemblies 11 shown in FIGS. 1 and 3. FIG. 5 is another schematic structural diagram of a clamping assembly 11 provided with an electrode assembly 22 according to an embodiment of this application. For example, the difference between FIGS. 5 and 4 is as follows: in FIG. 4, the clamping assembly 11 keeps clamping the electrode assembly 22, while in FIG. 5, the clamping assembly 11 has released the electrode assembly 22.

As shown in FIGS. 3 to 5, the clamping assembly 11 in this embodiment of this application further includes a bearing module 114, where the bearing module 114 is stacked with the moving module 112 along a third direction Z and is close to the material, and a surface of the bearing module 114 facing the material is a bearing surface 1141. The bearing module 114 is provided between the moving module 112 and the material, for example, provided between the moving module 112 and the electrode assembly 22, which facilitates the bearing module 114 in bearing the electrode assembly 22 without affecting the movement of the moving module 112 under the action of the driving force, making implementation easier.

It should be understood that the structure of the bearing module 114 in this embodiment of this application may be configured depending on practical applications. For example, the bearing module 114 may be a plate-like structure. Correspondingly, the moving module 112 may also be a plate-like structure. In this way, the bearing module 114 and the moving module 112 are stacked, which is not only conducive to the processing and assembly of the bearing module 114 and the moving module 112, but also helps save the overall volume of the clamping assembly 11, simplifying the overall structure of the clamping assembly 11.

It should be understood that the bearing module 114 of the clamping assembly 11 in this embodiment of this application may be used to bear the electrode assembly 22 and an end surface of the electrode assembly 22 provided with the tab 222 faces the bearing module 114, so that the electrode assembly 22 is placed on the clamping assembly 11 along the third direction Z, where the third direction Z is perpendicular to the end surface of the electrode assembly 22 provided with the tab 222. On one hand, considering that during the coating of the insulation layer 23, the insulation layer 23 does not need to cover the end surface of the electrode assembly 22 provided with the tab 222, therefore, when the electrode assembly 22 is being conveyed through the clamping assembly 11, the end surface faces the bearing module 114, so that the coating process of the insulation layer 23 is not affected and the electrode assembly 22 does not need to be turned over during the coating process of the insulation layer 23, avoiding damage to the electrode assembly 22. On the other hand, the end surface provided with the tab 222 faces the bearing module 114 and the electrode assembly 22 is disposed on the clamping assembly 11 along the third direction Z, so that using its own gravity, the electrode assembly 22 can be placed on the clamping assembly 11, facilitating provision and improving the stability of the electrode assembly 22 on the clamping assembly 11.

Optionally, considering the processing sequence of the battery cell 2, the clamping assembly 11 may also be used to bear other components of the battery cell 2. For example, the clamping assembly 11 is configured to bear the electrode assembly 22 and the end cover 212, where the end cover 212 is attached to the end surface of the electrode assembly 22 provided with the tab 222, and the bearing module 114 is attached to the surface of the end cover 212 away from the electrode assembly 22. During the assembly of the battery cell 2, the electrode assembly 22 and the end cover 212 may be fixed first. For example, the electrode terminal 214 of the end cover 212 may be connected to the corresponding tab 222 through the connecting member 24, so that the end cover 212 and the electrode assembly 22 are relatively fixed, that is, the end cover 212 and the electrode assembly 22 may be processed together in subsequent steps. In other words, the clamping assembly 11 can be used to bear the electrode assembly 22 and the end cover 212, where the bearing module 114 of the clamping assembly 11 is in contact with a surface of the end cover 212 away from the electrode assembly 22, while a surface of the end cover 212 close to the electrode assembly 22 is attached to one end surface of the electrode assembly 22. In this way, the clamping assembly 11 can simultaneously convey the electrode assembly 22 and the end cover 212 for subsequent assembly processes, which is conducive to improving the processing efficiency of the battery cell 2.

It should be understood that the bearing module 114 in this embodiment of this application includes a bearing surface 1141, where the bearing surface 1141 is a surface of the bearing module 114 and the surface may be a flat surface for easy processing of the clamping assembly 11; or the bearing surface 1141 may be an uneven surface, for example, the morphology of the bearing surface 1141 may be configured according to the morphology of a component in contact with it. For example, when the bearing surface 1141 is in contact with the surface of the end cover 212, considering that the surface of the end cover 212 away from the electrode assembly 22 may have a component with a protruding or recessed portion, therefore, the surface of the end cover 212 away from the electrode assembly 22 is usually uneven. Correspondingly, the bearing surface 1141 may also be uneven to adapt to the surface of the end cover 212 away from the electrode assembly 22. For example, the end cover 212 is provided with an electrode terminal 214, where the electrode terminal 214 protrudes from the surface of the end cover 212 away from the electrode assembly 22. Accordingly, a recessed region may be provided on the bearing surface 1141 to accommodate the electrode terminal 214, allowing the surface of the end cover 212 to adapt to the bearing surface 1141. On one hand, positioning can be implemented through the corresponding relationship between the protruding portion and the recessed region, facilitating the accurate placement of the end cover 212 and the electrode assembly 22 on the bearing surface 1141, and improving the stability of the end cover 212 on the bearing surface 1141 for improved conveying stability of the clamping assembly 11. On the other hand, the wear of the bearing surface 1141 on the surface of the end cover 212 can be reduced, improving the qualification rate of the battery cell 2.

Optionally, as shown in FIGS. 3 to 5, the two clamping modules 111 are respectively configured to clamp two opposite first end surfaces 223 of the material, the first end surface 223 being perpendicular to the bearing surface 1141. The two opposite first end surfaces 223 of the material are clamped by the two clamping modules 111, so that the clamping force on the material is relatively uniform, maintaining the balance of the material on the bearing surface 1141 to enhance the stability of the material on the clamping assembly 11. Moreover, the first end surface 223 is perpendicular to the bearing surface 1141, so that the clamping of the material by the clamping modules 111 does not affect the standing of the material on the bearing surface 1141 under its own gravity, thereby improving the stability of the material.

Optionally, as shown in FIGS. 3 to 5, both the second direction Y and the first direction X are parallel to the bearing surface 1141. The first direction X is parallel to the bearing surface 1141, so that when the two clamping modules 111 move, the material electrode assembly 22 remains relatively stable on the bearing surface 1141 under its own gravity, avoiding affecting the position of the electrode assembly 22 due to the movement of the clamping modules 111. Similarly, the second direction Y is also parallel to the bearing surface 1141, so that when the moving module 112 moves under the action of a driving force, the material electrode assembly 22 can still remain relatively stable on the bearing surface 1141 under its own gravity, avoiding affecting the position of the electrode assembly 22 due to the movement of the moving module 112.

Figure 6:
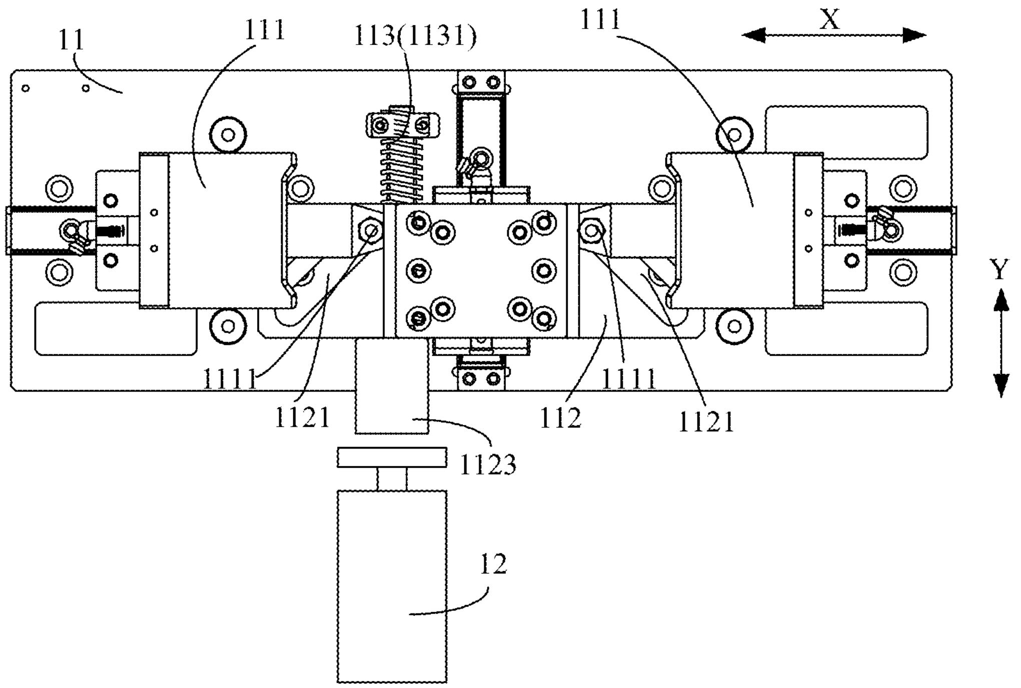
FIG. 6 is a schematic top view of a local structure of a clamping assembly according to an embodiment of this application.
Figure 7:
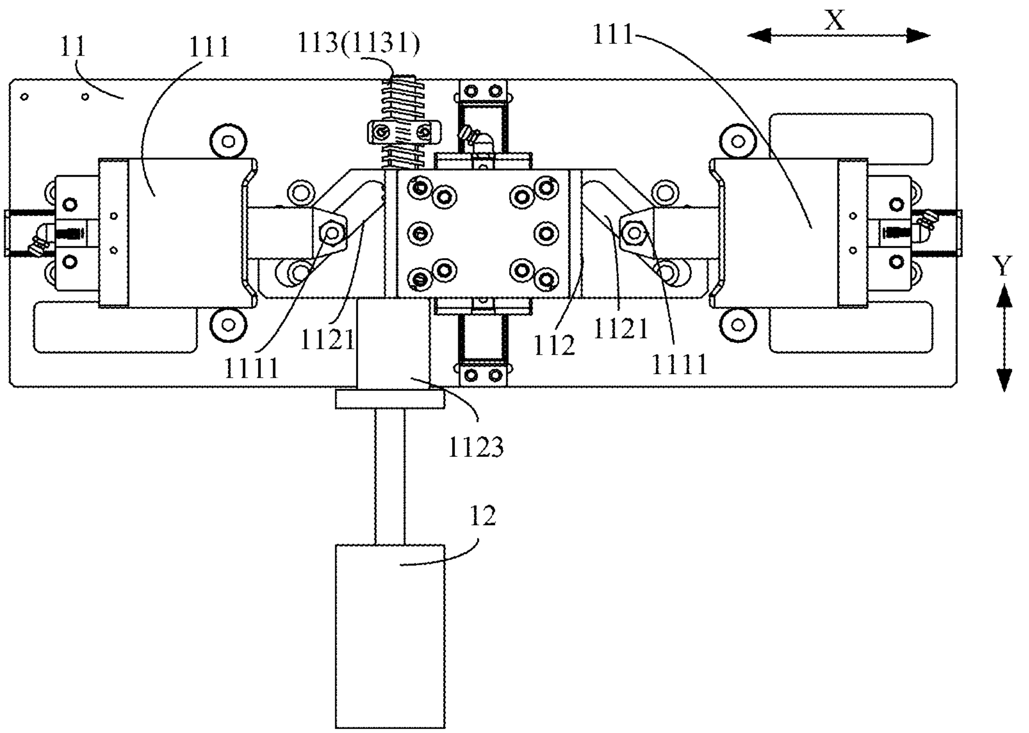
FIG. 7 is another schematic top view of a local structure of a clamping assembly according to an embodiment of this application.
Figure 8:
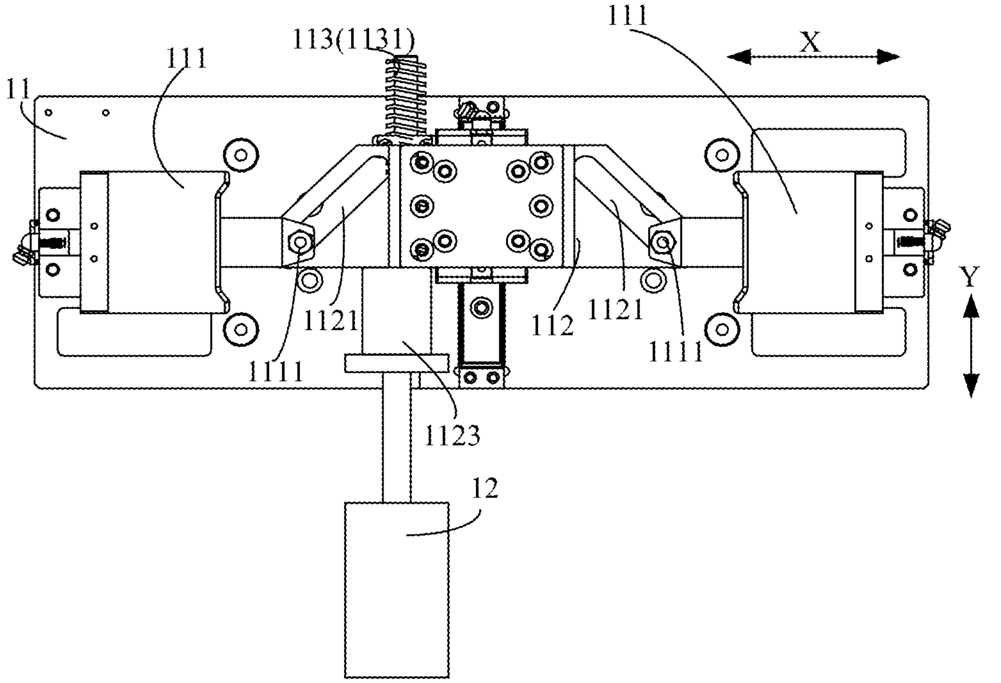
FIG. 8 is still another schematic top view of a local structure of a clamping assembly according to an embodiment of this application.

The following describes a clamping state and a releasing state of the clamping assembly 11 in this embodiment of this application in detail with reference to accompanying drawings. FIGS. 6 to 8 are respectively schematic top views of the clamping assembly 11 in this embodiment of this application in several different states. For example, FIGS. 6 to 8 are schematic top views of a local region of the clamping assembly 11 shown in FIG. 1.

As shown in FIG. 6, the clamping assembly 11 includes: a holding structure 113, where the holding structure 113 is connected to the moving module 112, the holding structure 113 is configured to hold the moving module 112 at a target position, and the two clamping modules 111 are configured to clamp the material along the first direction X when the moving module 112 is located at the target position. In this way, under the action of the holding structure 113, the moving module 112 can be located at a target position, and correspondingly, the two clamping modules 111 are relatively close to each other, so that the two clamping modules 111 can keep clamping the electrode assembly 22 along the first direction X.

Optionally, the holding structure 113 in this embodiment of this application can be implemented in various ways. For example, as shown in FIG. 6, the holding structure 113 includes a spring 1131 extending along the second direction Y. When the spring 1131 is not subjected to an external force, the spring 1131 automatically returns to its initial state, simultaneously pushing the moving module 112 to the target position and holding it at the target position, so that the two clamping modules 111 keep clamping the electrode assembly 22. The structure is simple and easy to implement.

Optionally, the type of the spring 1131 in this embodiment of this application may be flexibly configured depending on practical applications. For example, the spring 1131 may be a compression spring or a tension spring, and this embodiment of this application is not limited thereto.

In this embodiment of this application, as shown in FIG. 7, with reference to the comparison between FIGS. 7 and 6, when the moving module 112 is subjected to a driving force applied by a driving assembly 12 of the conveying mechanism along the second direction Y, the moving module 112 is configured to move along the second direction Y and the two clamping modules 111 are configured to move along the first direction X away from each other to release the material. Specifically, when the driving assembly 12 gradually applies the driving force to the moving module 112 along the second direction Y, the moving module 112 moves along the second direction Y. For example, the second direction Y including the vertically upward direction as shown in FIG. 7 is used as an example for description, that is, when the driving assembly 12 applies a driving force to the moving module 112 along the vertically upward second direction Y as shown in FIG. 7, the moving module 112 correspondingly moves along the vertically upward second direction Y under the action of the driving force. Correspondingly, the two clamping modules 111 linked to the moving module 112 move along the first direction X away from each other. As a result, the distance between the two clamping modules 111 gradually increases, and the clamping force of the two clamping modules 111 on the electrode assembly 22 also gradually decreases.

Optionally, the moving module 112 includes a driving part 1123, where the driving part 1123 is in contact with the driving assembly 12 and receives the driving force applied by the driving assembly 12. Through the contact between the driving part 1123 and the driving assembly 12, the driving force applied by the driving assembly 12 can be quickly received and transferred, enabling the moving module 112 to quickly respond and move along the second direction Y under the action of the driving force.

As shown in FIG. 8, with reference to the comparison between FIGS. 8 and 7, when the driving force applied by the driving assembly 12 along the vertically upward second direction Y gradually increases until the moving module 112 moves to the farthest distance along the vertically upward second direction Y, the two clamping modules 111 linked to the moving module 112 also move along the first direction X away from each other until the distance therebetween is maximum. At this point, the material electrode assembly 22 can be removed from between the two clamping modules 111, that is, the electrode assembly 22 can be removed from the clamping assembly 11.

As shown in FIGS. 6 to 8, when the driving assembly 12 applies a driving force and the driving force exceeds the holding force of the holding structure 113, the moving module 112 is caused to leave the target position. For example, taking the spring 1131 as an example, the spring 1131 is configured to be compressed along the second direction Y when the driving assembly 12 applies a driving force to the moving module 112 along the second direction Y. For example, when the driving assembly 12 applies a driving force along the vertically upward second direction Y, the spring 1131 can be compressed.

It should be understood that, FIGS. 6 to 8 can be considered as a process in which the driving force of the driving assembly 12 along the vertically upward second direction Y gradually increases; and conversely, FIGS. 8 to 6 can be considered as a process in which the driving force of the driving assembly 12 along the vertically upward second direction Y gradually decreases.

Specifically, as shown in FIG. 8, when the distance between the two clamping modules 111 is maximum, the electrode assembly 22 can be placed between the two clamping modules 111, so that the electrode assembly 22 is placed on the clamping assembly 11.

As shown in FIG. 7, with reference to the comparison between FIGS. 7 and 8, when the driving force of the driving assembly 12 along the vertically upward second direction Y gradually decreases, the moving module 112 gradually moves along the vertically downward second direction Y under the action of the holding structure 113. At this time, the two clamping modules 111 linked to the moving module 112 approach each other along the first direction X, that is, the distance between the two clamping modules 111 gradually decreases. Consequently, the two clamping modules 111 can gradually approach the electrode assembly 22 and gradually clamp the electrode assembly 22.

As shown in FIG. 6, with reference to the comparison between FIGS. 6 and 7, when the driving assembly 12 does not apply a driving force to the moving module 112, under the action of the holding structure 113, the moving module 112 returns to the target position. The two clamping modules 111 linked to the moving module 112 approach each other along the first direction X and clamp the electrode assembly 22, implementing the fixation between the electrode assembly 22 and the clamping assembly 11.

It should be understood that with the gradual decrease of the driving force applied by the driving assembly 12, the holding structure 113 allows the moving module 112 to gradually approach the target position. For example, taking the holding structure 113 being a spring 1131 as an example, the spring 1131 is configured to reset along the second direction Y when the driving assembly 12 does not apply a driving force to the moving module 112. Specifically, as shown in FIGS. 8 to 6, with the gradual decrease of the driving force applied by the driving assembly 12, the spring 1131 gradually recovers from the compressed state until the driving assembly 12 does not apply a driving force, and the spring 1131 returns to the original state along the second direction Y. This allows the moving module 112 to move to the target position and remain at the position when the driving assembly 12 does not apply a driving force. In this way, the two clamping modules 111 linked to the moving module 112 can maintain the state of clamping the electrode assembly 22 to fix the electrode assembly 22.

It should be understood that when an electrode assembly 22 is provided between the two clamping modules 111, the target position of the moving module 112 can be configured based on the size of the clamped electrode assembly 22 itself, allowing the two clamping modules 111 to clamp the electrode assembly 22 tightly. In addition, when no component is disposed between the two clamping modules 111, the moving module 112, under the action of the holding structure 113, can still return to the target position. The two clamping modules 111 approach each other, but do not clamp any components.

It should be understood that specific structures of the two clamping modules 111 in this embodiment of this application may be flexibly configured depending on practical applications. For example, the two clamping modules 111 can be configured as mutually symmetrical structures, so that when the two clamping modules 111 clamp the electrode assembly 22, the clamping force applied to the electrode assembly 22 is relatively uniform, maintaining the stability of the electrode assembly 22. For example, each clamping module 111 in this embodiment of this application may have a cylindrical structure, the size of a region where each clamping module 111 is in contact with the electrode assembly 22 may be flexibly configured depending on practical applications, and this embodiment of this application is not limited thereto.

In this embodiment of this application, the linkage between the moving module 112 and the two clamping modules 111 can be implemented in various ways. For example, a sliding groove and a protrusion capable of moving in the sliding groove can be provided to implement the linkage between the moving module 112 and the two clamping modules 111. Specifically, as shown in FIGS. 6 to 8, the moving module 112 includes a sliding groove structure 1121, and each clamping module 111 in the two clamping modules 111 includes a protrusion structure 1111, and at least part of the protrusion structure 1111 is accommodated in the sliding groove structure 1121 and moves in the sliding groove structure 1121. The sliding groove structure 1121 accommodates at least part of the protrusion structure 1111 so that the protrusion structure 1111 can slide in the sliding groove structure 1121. Thus, through reasonable design of the sliding groove structure 1121, the two clamping modules 111 with protrusion structures 1111 can be linked relative to the moving module 112 with the sliding groove structures 1121. The structure is simple and easy to implement.

Optionally, an extension direction of the sliding groove structure 1121 can be configured depending on practical applications. For example, the extension direction of the sliding groove structure 1121 may be determined based on the first direction X and the second direction Y. For another example, the extension direction of the sliding groove structure 1121 is different from the second direction Y and the first direction X. In this way, when the driving assembly 12 applies a driving force to the moving module 112 along the second direction Y, the arrangement of the extension direction of the sliding groove structure 1121 allows the two clamping modules 111 to move along the first direction X which is different from the second direction Y. For another example, the extension direction of the sliding groove structure 1121 may further be related to at least one of the following parameters: a moving speed of the moving module 112, moving speeds of the two clamping modules 111, a magnitude of a driving force applied by the driving assembly 12, and an elastic coefficient of the spring 1131. In other words, the extension direction of the sliding groove structure 1121 may be determined based on at least one of the foregoing parameters, but this embodiment of this application is not limited thereto.

Optionally, as shown in FIGS. 6 and 8, the moving module 112 includes two sliding groove structures 1121, and the two sliding groove structures 1121 are in one-to-one correspondence with the protrusion structures 1111 of the two clamping modules 111. Considering that a material electrode assembly 22 is provided between the two clamping modules 111 in this embodiment of this application, there is a certain distance between the two clamping modules 111. Correspondingly, there is also a certain distance between the protrusion structures 1111 of the two clamping modules 111. Therefore, two sliding groove structures 1121 may be provided to accommodate the two protrusion structures 1111 respectively, so that the two sliding groove structures 1121 do not affect each other, enhancing structural reliability.

Alternatively, as shown in FIGS. 6 to 8, included angles between the two sliding groove structures 1121 and the first direction X are equal. Considering that the two clamping modules 111 usually need to move synchronously, for example, approaching or moving away from each other, therefore, the included angles between the two sliding groove structures 1121 and the first direction X may be arranged as equal so as to synchronize the movement of the protrusion structures 1111 of the two clamping modules 111, thereby synchronizing the movement of the two clamping modules 111 and improving the clamping efficiency of the two clamping modules 111.

In this embodiment of this application, the moving module 112 moves along the second direction Y, where the second direction Y may be flexibly configured depending on practical applications. For example, the second direction Y is perpendicular to the third direction Z, so that when the moving module 112 moves under the action of a driving force, the material electrode assembly 22 remains relatively stable on the bearing surface 1141 under its own gravity, avoiding affecting the position of the electrode assembly 22 due to the movement of the moving module 112.

For another example, the second direction Y is perpendicular to the first direction X. In this way, the movement direction of the moving module 112 is perpendicular to the movement direction of the clamping module 111, and the two will not affect each other at the movement positions. In addition, when the driving assembly 12 applies a driving force along the second direction Y, the movement of the two clamping modules 111 will not be hindered, simplifying the structural design and making implementation easier.

Optionally, if the second direction Y is configured as perpendicular to the first direction X, the extension direction of the sliding groove structure 1121 may be located between the first direction X and the second direction Y. For example, the extension direction of the sliding groove structure 1121 may form a 45° included angle with the first direction X and also form a 45° included angle with the second direction Y. This guarantees that the moving speed of the moving module 112 is equal to the moving speed of the clamping module 111, facilitating control. However, this embodiment of this application is not limited thereto.

Optionally, the above description mainly takes the holding structure 113 including a spring 1131 extending along the second direction Y as an example; alternatively, the holding structure 113 may be implemented in another way. Similarly, the linkage between the moving module 112 and the two clamping modules 111 in this embodiment of this application may also be implemented through another structure.

Figure 9:
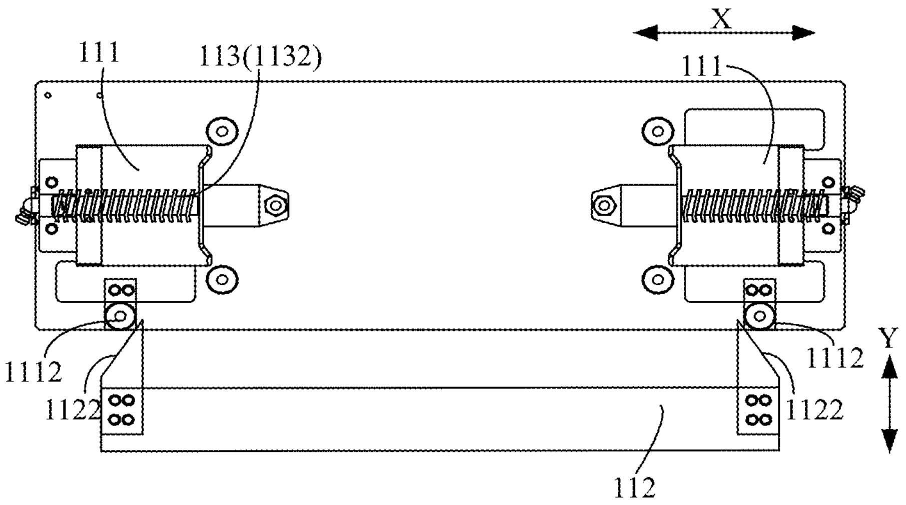
FIG. 9 is a schematic top view of a local structure of another clamping assembly according to an embodiment of this application.

For example, FIG. 9 is another schematic top view of the clamping assembly 11 in this embodiment of this application, showing another possible structure of the holding structure 113 in this embodiment of this application and also showing possible structures of the moving module 112 and the clamping modules 111 in this embodiment of this application. As shown in FIG. 9, the holding structure 113 of the clamping assembly 11 may include: a spring 1132 extending along the first direction X. Specifically, the spring 1132 extending along the first direction X may be arranged to be in one-to-one correspondence with the two clamping modules 111, that is, each spring 1132 is connected to one corresponding clamping module 111. Additionally, the moving module 112 of the clamping assembly 11 may include a wedge surface 1122. Correspondingly, each clamping module 111 in the two clamping modules 111 includes a cam 1112, so that the cam 1112 can move along the wedge surface 1122, allowing for the linkage between the moving module 112 and the two clamping modules 111.

Specifically, when the driving assembly 12 applies a driving force, that is, when the driving assembly 12 applies a driving force along the second direction Y to the moving module 112, the moving module 112 moves along the second direction Y. Correspondingly, the cams 1112 of the two clamping modules 111 move along the wedge surface 1122, allowing the two clamping modules 111 to move away from each other along the first direction X to release the electrode assembly 22 or place the electrode assembly 22. At this point, the springs 1132 deform under the action of the clamping modules 111. Conversely, when the driving assembly 12 gradually reduces the driving force until it stops applying the driving force, the springs 1132 return to the initial state to push the two clamping modules 111 to gradually approach each other so as to clamp the electrode assembly 22. Simultaneously, due to the interaction between the cam 1112 and the wedge surface 1122, the moving module 112 moves along the second direction Y to return to the target position.

Optionally, as shown in FIG. 9, considering that the moving module 112 may be positioned outside the clamping modules 111 when located at the target position, the moving module 112 may be separated from the two clamping modules 111. Therefore, in this embodiment, the moving module 112 may be disposed apart from the two clamping modules 111. That is, during the process in which the two clamping modules 111 move along different workstations with the material clamped, the moving module 112 does not move and can be fixed at the corresponding workstation. For example, the position of the moving module 112 may be flexibly configured depending on practical applications. For example, for an electrode assembly 22, a coating workstation and/or a housing enclosing workstation may be provided with the moving module 112, so that when the two clamping modules 111 move to the workstation with the electrode assembly 22 clamped, the moving module 112 can enable the two clamping modules 111 to move so as to release and clamp the electrode assembly 22. However, this embodiment of this application is not limited thereto.

Therefore, in this embodiment of this application, the clamping assembly 11 includes two clamping modules 111 apart from each other in the first direction X, where a material is located between the two clamping modules 111. The clamping assembly 11 further includes a moving module 112 linked to the two clamping modules 111. When the moving module 112 moves along the second direction Y, the two clamping modules 111 can move along the first direction X approaching each other to clamp the material; or the two clamping modules 111 can move along the first direction X away from each other to release the material, where the first direction X and the second direction Y are different. In this way, during the clamping of the material by the clamping assembly 11, when the moving module 112 of the clamping assembly 11 moves under the action of a driving force, the movement of the moving module will not obstruct the movement of the clamping module 111. This facilitates clamping of the material between the two clamping modules 111 or removal or placement of the material between the two clamping modules 111, without the need to consider whether the movement direction of the moving module 112 hinders the material, which is more convenient and efficient, thereby improving the conveying efficiency of the material.

Figure 10:
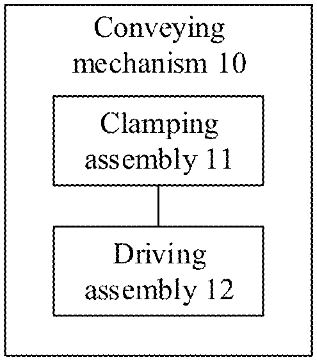
FIG. 10 is a schematic block diagram of a conveying mechanism according to an embodiment of this application.

FIG. 10 is a schematic block diagram of a conveying mechanism 10 according to an embodiment of this application. As shown in FIG. 10, the conveying mechanism 10 in this embodiment of this application includes a clamping assembly 11. The clamping assembly 11 may be the clamping assembly 11 as shown in FIGS. 10 and 9, so as to convey material through the conveying mechanism 10.

Optionally, as shown in FIG. 10, the conveying mechanism 10 further includes a driving assembly 12 configured to apply a driving force to the clamping assembly 11, where the clamping assembly 11 is configured to release the material under action of the driving force.

An embodiment of this application further provides a device for assembling a battery cell 2, where the device includes the foregoing conveying mechanism 10 and the conveying mechanism 10 is configured to convey components of the battery cell 2 to be assembled between different workstations.

Optionally, the conveying mechanism 10 further includes a control assembly configured to control the movement of the clamping assembly 11 between different workstations so as to process the material at different workstations.

For example, when the conveying mechanism 10 is provided with an electrode assembly 22, for example, the conveying mechanism 10 can move gradually from a loading workstation to an unloading workstation, the control assembly can be configured to control the clamping assembly 11 to move stably between different workstations so as to convey the clamped electrode assembly 22 for assembly. In this case, a magnetic drive device may be selected as the control assembly to drive the movement of the clamping assembly 11 through a magnetic force, so as to maintain the stability and moving speed of the electrode assembly 22.

After the electrode assembly 22 is removed from the conveying mechanism 10, for example, after the unloading workstation, the conveying mechanism 10 can move back to the loading workstation to fix and convey a next electrode assembly 22. During the process in which the clamping assembly 11 of the conveying mechanism 10 returns from the unloading workstation to the loading workstation, since no component is clamped, another device can be selected as the control assembly to reduce time and cost. For example, the control assembly may include a conveying belt, where the conveying belt can be used for quickly conveying the clamping assembly 11 back to the loading workstation, completing one cycle process, that is, one process of the assembly of an electrode assembly 22 into the housing. However, this embodiment of this application is not limited thereto.

Although this application has been described with reference to some preferred embodiments, various modifications to this application and replacements of the components therein with equivalents can be made without departing from the scope of this application. In particular, as long as there is no structural conflict, the various technical features mentioned in the embodiments can be combined in any manner. This application is not limited to the specific embodiments disclosed in this specification but includes all technical solutions falling within the scope of the claims.

The invention claimed is:

1. A clamping assembly used for a conveying mechanism, comprising:

two clamping modules apart from each other in a first direction, wherein a material is located between the two clamping modules; and a moving module linked to the two clamping modules; and a bearing module stacked with the moving module along a third direction and adjacent to the material, a surface of the bearing module facing the material being a bearing surface configured to support the material under gravity, wherein the two clamping modules are configured to: when the moving module moves along a second direction, move along the first direction away from each other to release the material or move along the first direction approaching each other to clamp the material, the second direction being different from the first direction, wherein the bearing module is provided between the moving module and the material.

2. The clamping assembly according to claim 1, wherein the clamping assembly comprises:

a holding structure, wherein the holding structure is connected to the moving module, the holding structure is configured to hold the moving module at a target position, the target position of the moving module is configured based on a size of the material to allow the two clamping modules to clamp the material tightly, and the two clamping modules are configured to clamp the material along the first direction when the moving module is located at the target position.

3. The clamping assembly according to claim 2, wherein the holding structure comprises a spring extending along the second direction.

4. The clamping assembly according to claim 1, wherein when the moving module is subjected to a driving force applied by a driving assembly of the conveying mechanism along the second direction, the moving module is configured to move along the second direction, and the two clamping modules are configured to move along the first direction away from each other to release the material.

5. The clamping assembly according to claim 1, wherein the moving module comprises a sliding groove structure, and each clamping module in the two clamping modules comprises a protrusion structure, and at least part of the protrusion structure is accommodated in the sliding groove structure and moves in the sliding groove structure.

6. The clamping assembly according to claim 5, wherein an extension direction of the sliding groove structure is different from the second direction and the first direction.

7. The clamping assembly according to claim 5, wherein the moving module comprises two sliding groove structures, and the two sliding groove structures are in one-to-one correspondence with the protrusion structures of the two clamping modules.

8. The clamping assembly according to claim 7, wherein included angles between the two sliding groove structures and the first direction are equal.

9. The clamping assembly according to claim 1, wherein the second direction is perpendicular to the first direction.

10. The clamping assembly according to claim 1, wherein the two clamping modules are respectively configured to clamp two opposite first end surfaces of the material, the first end surfaces being perpendicular to the bearing surface.

11. The clamping assembly according to claim 10, wherein the second direction and the first direction are both parallel to the bearing surface; and/or wherein the material is an electrode assembly in a battery cell.

12. The clamping assembly according to claim 1, wherein the material is configured to remain on the bearing surface under its own gravity while the moving module moves.

13. The clamping assembly according to claim 1, wherein the material is an electrode assembly of a battery cell arranged to stand on the bearing surface along the third direction.

14. The clamping assembly according to claim 13, wherein the electrode assembly is provided with a tab, an end surface of the electrode assembly provided with the tab faces the bearing module, the electrode assembly is placed on the clamping assembly along the third direction.

15. The clamping assembly according to claim 14, wherein the clamping assembly is configured to bear the electrode assembly and an end cover, the end cover being attached to an end surface of the electrode assembly provided with the tab, and the bearing module is attached to a surface of the end cover away from the electrode assembly.

16. The clamping assembly according to claim 15, wherein an electrode terminal of the end cover is configured to be connected to the tab through a connecting member.

17. A conveying mechanism, comprising:

a clamping assembly; and a driving assembly, wherein the clamping assembly comprises:

two clamping modules apart from each other in a first direction, wherein a material is located between the two clamping modules; and a moving module linked to the two clamping modules; and a bearing module stacked with the moving module along a third direction and adjacent to the material, a surface of the bearing module facing the material being a bearing surface configured to support the material under gravity, wherein the two clamping modules are configured to: when the moving module moves along a second direction, move along the first direction away from each other to release the material or move along the first direction approaching each other to clamp the material, the second direction being different from the first direction, wherein the bearing module is provided between the moving module and the material, wherein driving assembly is configured to apply a driving force to the clamping assembly, wherein the clamping assembly is configured to release the material under action of the driving force.

18. A device for assembling a battery cell, comprising:

the conveying mechanism according to claim 17, wherein the conveying mechanism is configured to convey components of the battery cell to be assembled between different workstations.

* * * * *